US012224524B2

(12) United States Patent
Li et al.

(10) Patent No.: US 12,224,524 B2
(45) Date of Patent: Feb. 11, 2025

(54) CONNECTOR ASSEMBLY WITH PLUG, HAVING LOCKING FEATURES WHICH ARE OPERATIVELY ARRANGED BETWEEN PLUG HOUSING AND SOCKET HOUSING AND ARE ADAPTED TO RELEASE PORTION OF INSERTION PATH OF PLUG HOUSING AND SOCKET HOUSING IN ROTATIONAL POSITION

(71) Applicant: Tyco Electronics (Shanghai) Co. Ltd., Shanghai (CN)

(72) Inventors: Jianxiong Li, Shanghai (CN); Yuchen Yang, Shanghai (CN); Reicky Zhang, Shanghai (CN); Haomai Yin, Shanghai (CN); Xionghui Zheng, Suzhou (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 402 days.

(21) Appl. No.: 17/696,183

(22) Filed: Mar. 16, 2022

(65) Prior Publication Data

US 2022/0302643 A1 Sep. 22, 2022

(51) Int. Cl.
*H01R 13/627* (2006.01)
*H01R 13/502* (2006.01)
(Continued)

(52) U.S. Cl.
CPC ....... *H01R 13/6272* (2013.01); *H01R 13/502* (2013.01); *H01R 13/629* (2013.01); *H01R 13/639* (2013.01)

(58) Field of Classification Search
CPC .............. H01R 13/6272; H01R 13/502; H01R 13/629; H01R 13/637
(Continued)

(56) References Cited

U.S. PATENT DOCUMENTS 4,229,064 A 10/1980 Vetter et al.
4,542,952 A * 9/1985 Tomsa ................ H01R 13/625 439/321
(Continued)

FOREIGN PATENT DOCUMENTS

CN 207021444 U * 2/2018
CN 110581391 A 12/2019
(Continued)

*Primary Examiner* — Peter G Leigh
(74) *Attorney, Agent, or Firm* — Potomac Law Group, PLLC

(57) ABSTRACT

The present invention discloses a connector and a connector assembly. The connector assembly has a first connector having a first housing and a second connector adapted to mate with the first connector and comprising a second housing. The first housing is adapted to be partially inserted into the second housing along an axial direction of the second housing, and an elastic latch for locking the second housing is formed on the first housing; a latch safety is installed on the second housing and movable along a circumferential direction of the second housing between a safety position to prevent the elastic latch from being unlocked and a pre-locking position to allow the elastic latch to be unlocked, a pushing part is formed on the first housing and adapted to push the latch safety to the pre-locking position at which the first housing is allowed to be inserted into the second housing. Therefore, in the present invention, before mating the first connector and the second connector, the operator does not need to check whether the latch safety has been reset to the pre-locking position. Thus, the mating operation of the first and second connectors is very simple and safe.

14 Claims, 12 Drawing Sheets

(51) Int. Cl.
*H01R 13/629* (2006.01)
*H01R 13/639* (2006.01)

(58) Field of Classification Search
USPC .......................................................... 439/345
See application file for complete search history.

(56) References Cited

U.S. PATENT DOCUMENTS

| | | | | |
|---|---|---|---|---|
| 4,764,129 | A | 8/1988 | Jones et al. | |
| 5,190,467 | A | 3/1993 | Ohta | |
| 5,397,196 | A * | 3/1995 | Boiret | F16B 21/04 285/376 |
| 5,662,488 | A * | 9/1997 | Alden | H01R 13/625 439/314 |
| 5,729,644 | A | 3/1998 | Shiflett et al. | |
| 5,902,155 | A | 5/1999 | Polgar et al. | |
| 6,383,032 | B1 | 5/2002 | Gerberding | |
| 6,769,813 | B2 | 8/2004 | Cheng | |
| 7,258,493 | B2 | 8/2007 | Milette | |
| 7,347,742 | B2 | 3/2008 | Hall et al. | |
| 7,347,745 | B1 | 3/2008 | Raudenbush et al. | |
| 7,381,072 | B2 | 6/2008 | Nagano | |
| 7,674,046 | B2 | 3/2010 | Milette | |
| 7,909,658 | B2 | 3/2011 | Pfaffenbach | |
| 7,980,894 | B1 | 7/2011 | Hall et al. | |
| 8,011,942 | B2 * | 9/2011 | Ohmori | H01R 13/6315 439/352 |
| 8,968,021 | B1 | 3/2015 | Kennedy et al. | |
| 9,437,961 | B1 * | 9/2016 | Smajda | H01R 13/28 |
| 9,595,789 | B1 | 3/2017 | Ehrman et al. | |
| 9,680,256 | B1 | 6/2017 | Lane et al. | |
| 9,837,761 | B1 | 12/2017 | Hardy et al. | |
| 10,153,581 | B2 | 12/2018 | Mitchell | |
| 10,256,574 | B2 | 4/2019 | Nishida et al. | |
| 10,355,406 | B2 * | 7/2019 | Joniak | H01R 13/436 |
| 10,557,621 | B2 | 2/2020 | Gietl et al. | |
| 10,594,069 | B2 | 3/2020 | Kon et al. | |
| 10,649,152 | B1 | 5/2020 | Yang | |
| 10,847,927 | B2 | 11/2020 | Maddens et al. | |
| 10,862,243 | B2 | 12/2020 | Nishiyama | |
| 11,011,871 | B2 * | 5/2021 | Fujiwara | H01R 13/631 |
| 2004/0192099 | A1 | 9/2004 | Seminara et al. | |
| 2005/0208820 | A1 * | 9/2005 | Sanuki | H01R 13/623 439/372 |
| 2007/0020986 | A1 | 1/2007 | Fry et al. | |
| 2007/0054535 | A1 | 3/2007 | Hall et al. | |
| 2007/0105417 | A1 * | 5/2007 | Camelio | H01R 13/6277 439/133 |
| 2009/0029584 | A1 * | 1/2009 | Sami | H01R 13/6277 439/345 |
| 2009/0191750 | A1 | 7/2009 | Kadar-Kallen et al. | |
| 2012/0190234 | A1 | 7/2012 | Montena et al. | |
| 2012/0238124 | A1 | 9/2012 | Zhao | |
| 2013/0137287 | A1 * | 5/2013 | Grimm | H01R 24/005 439/345 |
| 2013/0209041 | A1 * | 8/2013 | Szilagyi | G02B 6/3878 29/428 |
| 2016/0181721 | A1 | 6/2016 | Rauer | |
| 2017/0271815 | A1 | 9/2017 | Lane et al. | |
| 2018/0034202 | A1 * | 2/2018 | Pierce-Jones | H01R 13/7036 |
| 2018/0083397 | A1 | 3/2018 | Hall et al. | |
| 2018/0241154 | A1 | 8/2018 | Khorrami et al. | |
| 2019/0109408 | A1 | 4/2019 | Maddens et al. | |
| 2019/0148868 | A1 * | 5/2019 | Pierce-Jones | H01R 13/621 439/276 |
| 2019/0190200 | A1 | 6/2019 | Chang et al. | |
| 2020/0091661 | A1 | 3/2020 | Takahashi | |
| 2020/0119499 | A1 * | 4/2020 | Leischner | H01R 13/7036 |
| 2020/0144758 | A1 | 5/2020 | Itou et al. | |
| 2020/0153159 | A1 | 5/2020 | Gartenmaier | |
| 2020/0212630 | A1 * | 7/2020 | Qiu | H01R 13/641 |
| 2020/0227861 | A1 * | 7/2020 | Fujiwara | H01R 13/622 |
| 2020/0325941 | A1 * | 10/2020 | Nakamura | H01R 13/641 |
| 2020/0398684 | A1 | 12/2020 | Motomiya et al. | |
| 2020/0412047 | A1 | 12/2020 | Becavin et al. | |

FOREIGN PATENT DOCUMENTS

| | | | | |
|---|---|---|---|---|
| DE | 102012104857 | A1 * | 12/2013 | H01R 13/6275 |
| DE | 102013018160 | B3 * | 12/2015 | H01R 13/625 |
| DE | 102015105832 | B4 * | 3/2017 | |
| DE | 102017112160 | A1 * | 12/2018 | H01R 13/527 |
| EP | 0849839 | A1 * | 6/1998 | H01R 13/641 |
| EP | 1154169 | A1 * | 11/2001 | F16B 21/04 |
| JP | 2002231375 | A | 8/2002 | |
| JP | 2018045883 | A | 3/2018 | |
| JP | 2018125078 | A | 8/2018 | |
| JP | 2020187891 | A | 11/2020 | |
| WO | WO-2007040013 | A1 * | 4/2007 | H01R 13/5219 |
| WO | WO-2016166066 | A1 * | 10/2016 | |
| WO | 2020071119 | A1 | 4/2020 | |
| WO | 2020230583 | A1 | 11/2020 | |

* cited by examiner

CONNECTOR ASSEMBLY WITH PLUG, HAVING LOCKING FEATURES WHICH ARE OPERATIVELY ARRANGED BETWEEN PLUG HOUSING AND SOCKET HOUSING AND ARE ADAPTED TO RELEASE PORTION OF INSERTION PATH OF PLUG HOUSING AND SOCKET HOUSING IN ROTATIONAL POSITION

CROSS-REFERENCE TO RELATED APPLICATION

This application claims the benefit of Chinese Patent Application No. CN202110295761.4 filed on Mar. 19, 2021 in the State Intellectual Property Office of China, the whole disclosure of which is incorporated herein by reference.

BACKGROUND OF THE INVENTION

Field of the Invention

The present invention relates to a connector and a connector assembly.

Description of the Related Art

In the prior art, in order to realize the rapid electrical connection between cables or between cable and electrical equipment, a plug connector and a socket connector suitable for rapid matching with each other are usually adopted. In the prior art, in order to prevent the separation of the matched plug connector and socket connector, an elastic latch is usually arranged on the housing of the plug connector, which is suitable for locking to the housing of the socket connector. Generally, the elastic latch is capable of being unlocked so that the plug connector and socket connector can be separated and reused.

In the prior art, in order to prevent the elastic latch from being accidentally unlocked due to wrong operation, it is necessary to set a latch safety mechanism on the socket connector, which can be moved between a safety position and a pre-locking position (or called an initial position). After the plug connector is inserted into the socket connector, the elastic latch can be kept in the locking position by moving the latch safety mechanism to the safety position, so as to avoid the accidental unlocking of the elastic latch due to wrong operation.

In the prior art, before inserting the plug connector into the socket connector, the operator must ensure that the latch safety mechanism has been reset to the initial position (pre-locking position) at which the latch safety mechanism does not interfere with the elastic latch, otherwise the plug connector cannot be inserted, and even lead to collision damage between the elastic latch and the latch safety mechanism. Therefore, in the prior art, there is a risk of damage to the plug connector and socket connector due to wrong operation.

SUMMARY OF THE INVENTION

The present invention has been made to overcome or alleviate at least one aspect of the above mentioned disadvantages.

According to an aspect of the present invention, there is provided a connector assembly, comprising: a first connector comprising a first housing; and a second connector adapted to mate with the first connector and comprising a second housing. The first housing is adapted to be partially inserted into the second housing along an axial direction of the second housing, and an elastic latch for locking the second housing is formed on the first housing; a latch safety is installed on the second housing and movable along a circumferential direction of the second housing between a safety position to prevent the elastic latch from being unlocked and a pre-locking position to allow the elastic latch to be unlocked, a pushing part is formed on the first housing and adapted to push the latch safety to the pre-locking position at which the first housing is allowed to be inserted into the second housing.

According to an exemplary embodiment of the present invention, a guide slope inclined to the axial direction is formed on the pushing part, and the pushing part adapted to contact and push the latch safety through the guide slope, so as to drive and guide the latch safety to move from the safety position to the pre-locking position along the circumferential direction.

According to another exemplary embodiment of the present invention, a guide slot extending along the circumferential direction is formed on the outer wall of the second housing, the latch safety is slidably installed in the guide slot, and the guide slot is configured to guide the latch safety to move between the safety position and the pre-locking position along the circumferential direction.

According to another exemplary embodiment of the present invention, the latch safety comprises: a sliding plate slidably installed in the guide slot; and a limiting part connected to the sliding plate. An opening is formed on the second housing, and the limiting part extends into the second housing through the opening; front and rear edges of the opening in the axial direction are slidably held between the limiting part and the sliding plate to limit the movement of the latch safety in a radial direction of the second housing.

According to another exemplary embodiment of the present invention, the elastic latch comprises: an elastic cantilever connected to the first housing and adapted to move between a locking position and an unlocking position; and a locking portion formed on the elastic cantilever and adapted to lock the second housing. The latch safety includes a tongue connected to the limiting part; the tongue is adapted to be inserted into a gap between the elastic cantilever and the outer wall of the first housing to prevent the elastic cantilever from being moved to the unlocking position.

According to another exemplary embodiment of the present invention, the guide slope of the pushing part is adapted to contact and push the tongue part of the latch safety to move the latch safety from the safety position to the pre-locking position.

According to another exemplary embodiment of the present invention, the fixed end of the elastic cantilever is connected with the pushing part and is fixedly connected to the outer wall of the first housing through the pushing part.

According to another exemplary embodiment of the present invention, the elastic latch also includes a pressing part connected to the free end of the elastic cantilever, the pressing part is exposed to the outside of the second housing when the first housing is inserted into the second housing.

According to another exemplary embodiment of the present invention, two positioning grooves extending along the axial direction are formed on the bottom wall of the guide slot, and a positioning rib extending along the axial direction is formed on the inner surface of the sliding plate; when the latch safety is installed in the guide slot and moved to the safety position, the positioning rib is positioned in one of the two positioning grooves; when the latch safety is installed in the guide slot and moved to the pre-locking position, the positioning rib is positioned in the other of the two positioning grooves.

According to another exemplary embodiment of the present invention, an indication arrow is formed on the outer surface of the sliding plate, and a safety position identification and a pre-locking position identification are formed on the outer wall of the second housing; when the latch safety is installed in the guide slot and moved to the safety position, the indication arrow points to the safety position identification; when the latch safety is installed in the guide slot and moved to the pre-locking position, the indication arrow points to the pre-locking position identification.

According to another exemplary embodiment of the present invention, the guide slot is surrounded by a first end wall and a second end wall opposite to each other in the circumferential direction and two side walls opposite to each other in the axial direction; the latch safety is adapted to move between the first end wall and the second end wall of the guide slot along the circumferential direction.

According to another exemplary embodiment of the present invention, the sliding plate comprises a first end and a second end opposite to each other in the circumferential direction and front and rear sides opposite to each other in the axial direction; the first and second ends of the sliding plate respectively correspond to the first end wall and the second end wall of the guide slot, and the front and rear sides of the sliding plate respectively correspond to the two side walls of the guide slot.

According to another exemplary embodiment of the present invention, the connector assembly further comprising: a first terminal provided in a first terminal hole of the first housing; and a second terminal provided in a second terminal hole of the second housing and suitable for electrical contact with the first terminal.

According to another aspect of the present invention, there is provided a connector comprising a housing in which a terminal hole for placing a terminal is formed, the housing is provided with an elastic latch suitable for locking a mating housing; when the housing is inserted into the mating housing along an axial direction of the mating housing, the elastic latch cooperates with a latch safety to hold the housing and the mating housing in a mating position; the housing is provided with a pushing part, which is suitable for pushing the latch safety to a pre-locking position before the housing is inserted into the mating housing, so as to allow the housing to be inserted into the mating housing.

According to an exemplary embodiment of the present invention, the pushing part is provided with a guide slope inclined to the axial direction, and the pushing part is adapted to contact and push the latch safety through the guide slope, so as to drive and guide the latch safety to move from a safety position to the pre-locking position along the circumference of the mating housing.

In the above exemplary embodiments according to the present invention, in the process of mating the first connector and the second connector, the pushing part can push the latch safety to the pre-locking position at which the latch safety does not interfere with the elastic latch. Therefore, in the present invention, before mating the first connector and the second connector, the operator does not need to check whether the latch safety has been reset to the pre-locking position. Thus, the mating operation of the first and second connectors is very simple and safe.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
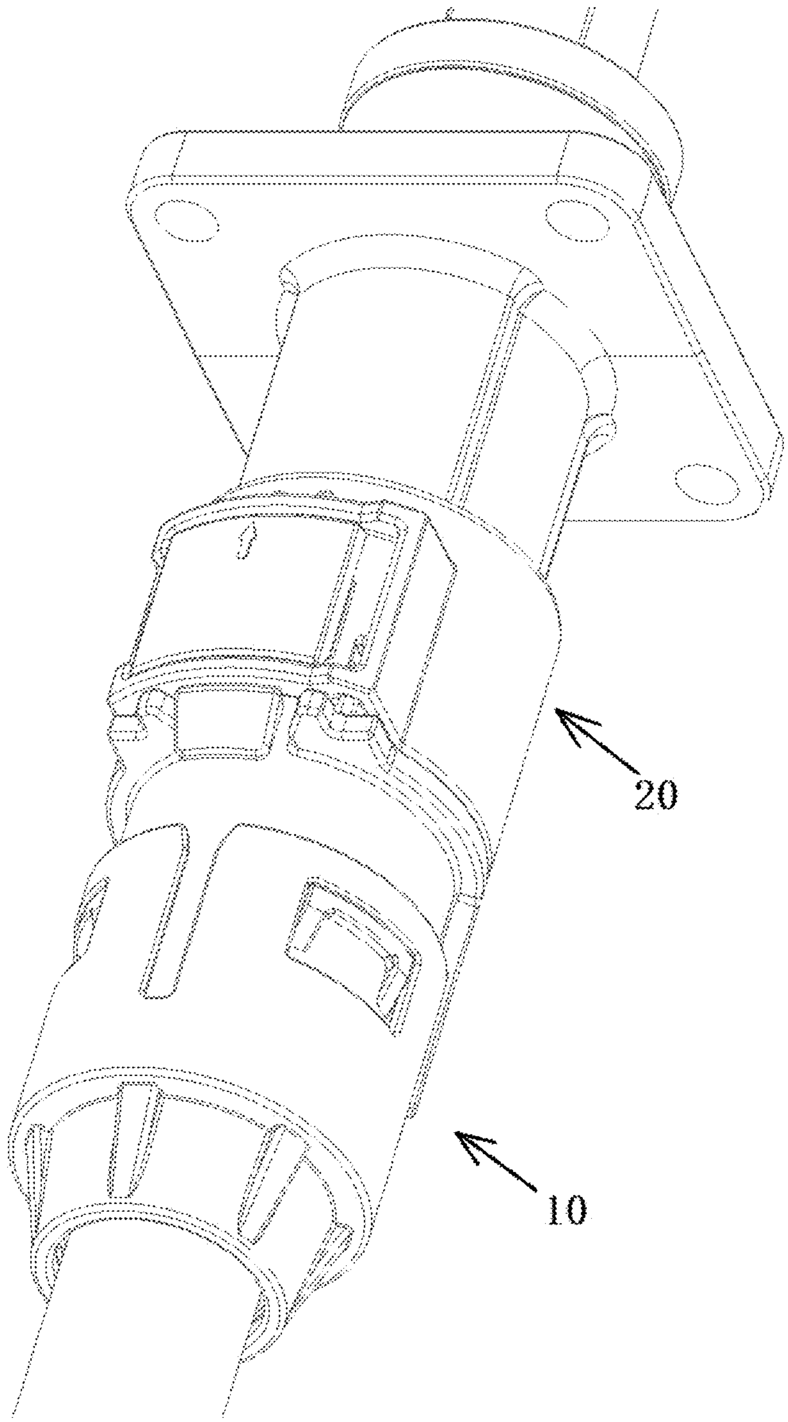
FIG. 1 shows a schematic diagram of a connector assembly according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a connector assembly, comprising: a first connector comprising a first housing; and a second connector adapted to mate with the first connector and comprising a second housing. The first housing is adapted to be partially inserted into the second housing along an axial direction of the second housing, and an elastic latch for locking the second housing is formed on the first housing; a latch safety is installed on the second housing and movable along a circumferential direction of the second housing between a safety position to prevent the elastic latch from being unlocked and a pre-locking position to allow the elastic latch to be unlocked, a pushing part is formed on the first housing and adapted to push the latch safety to the pre-locking position at which the first housing is allowed to be inserted into the second housing.

According to another general concept of the present invention, there is provided a connector comprising a housing in which a terminal hole for placing a terminal is formed, the housing is provided with an elastic latch suitable for locking a mating housing; when the housing is inserted into the mating housing along an axial direction of the mating housing, the elastic latch cooperates with a latch safety to hold the housing and the mating housing in a mating position; the housing is provided with a pushing part, which is suitable for pushing the latch safety to a pre-locking position before the housing is inserted into the mating housing, so as to allow the housing to be inserted into the mating housing.

Figure 2:
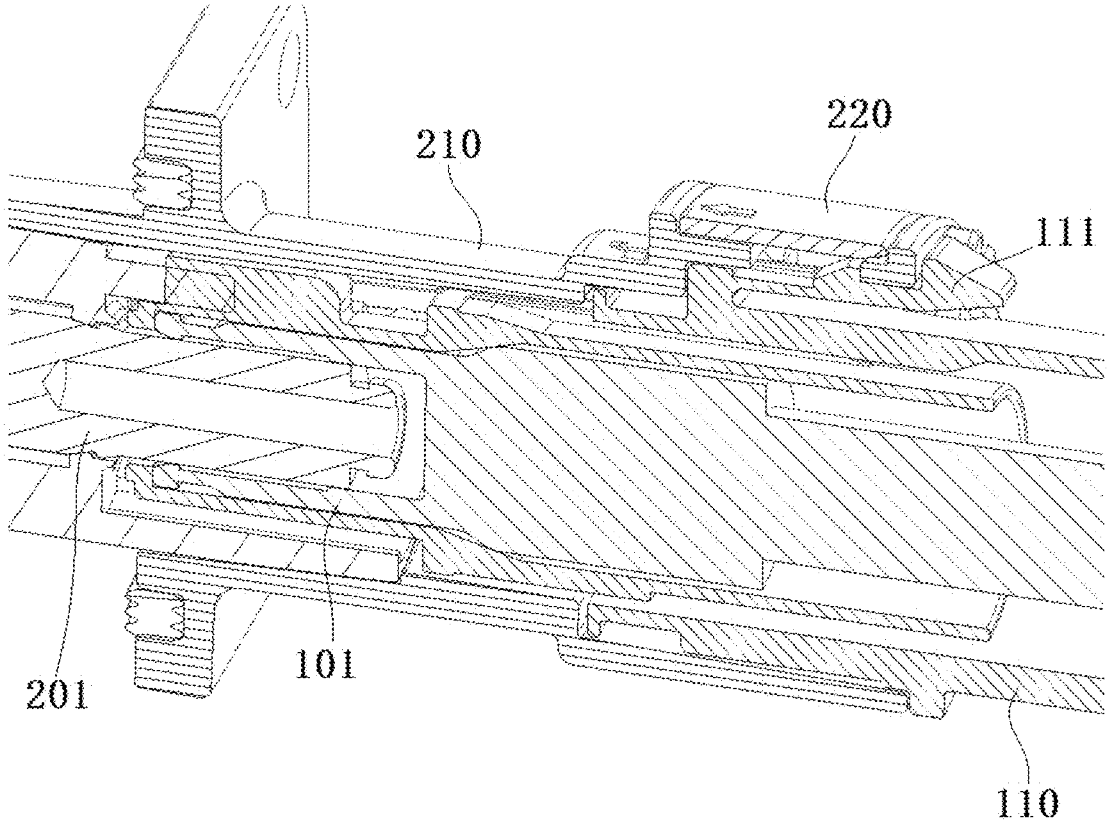
FIG. 2 shows a partial longitudinal sectional view of the connector assembly shown in FIG. 1.

FIG. 1 shows a schematic diagram of a connector assembly according to an exemplary embodiment of the present invention; FIG. 2 shows a partial longitudinal sectional view of the connector assembly shown in FIG. 1.

As shown in FIGS. 1 and 2, in the illustrated embodiment, the connector assembly mainly includes a first connector 10 and a second connector 20. One of the first connector 10 and the second connector 20 is a plug connector, and the other is a socket connector suitable for mating with the plug connector. In the illustrated embodiment, the first connector 10 is a plug connector and is connected to one end of the cable 1. The second connector 20 is a socket connector and is installed on electrical equipment (not shown). When the first connector 10 and the second connector 20 are mated together, the electrical connection between the cable 1 and the electrical equipment can be realized, so that power can be supplied to the electrical equipment through the cable 1.

Figure 3:
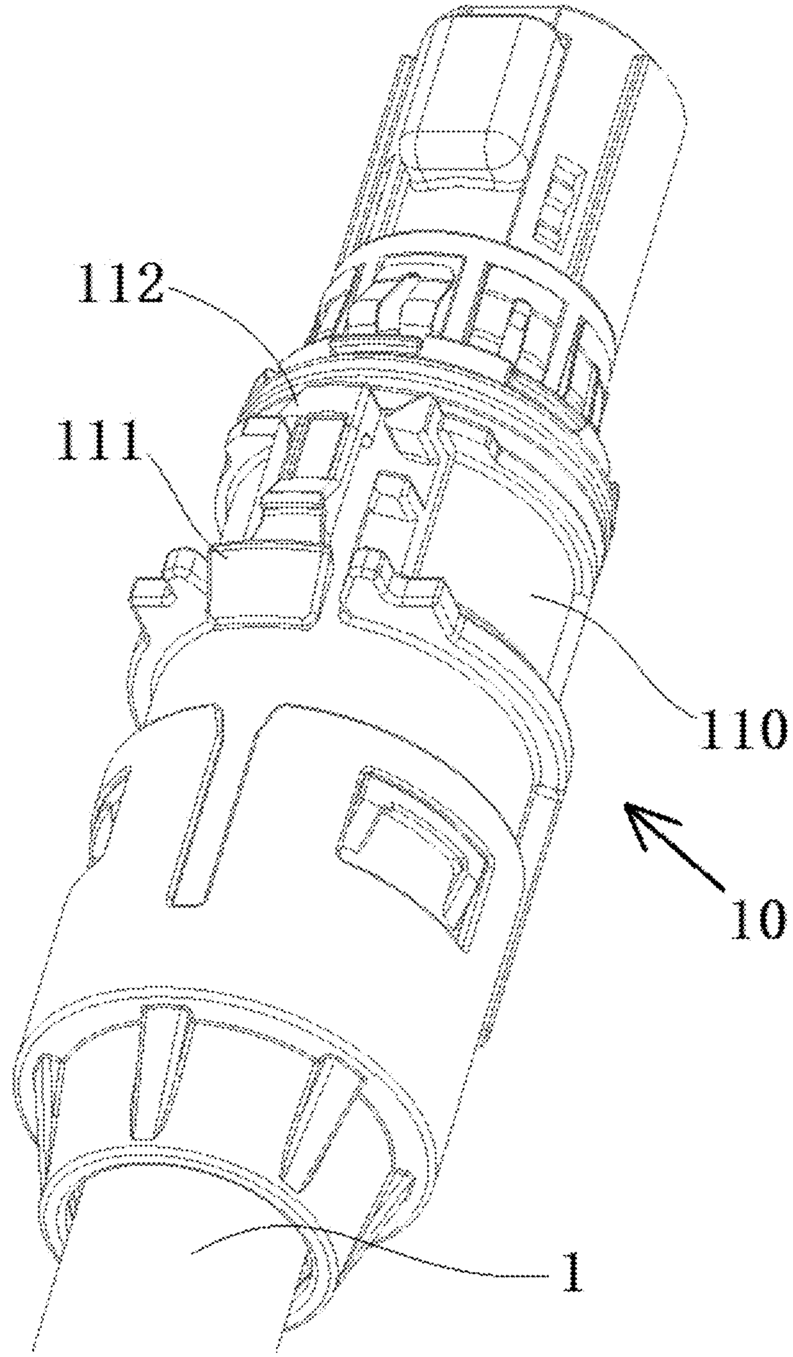
FIG. 3 shows a three-dimensional schematic diagram of the first connector in FIG. 1.

FIG. 3 shows a three-dimensional schematic diagram of the first connector 10 in FIG. 1.

As shown in FIGS. 1 to 3, in the illustrated embodiment, the first connector 10 includes a first housing 110 and a first terminal 101 arranged in the first housing 110, and the first terminal 101 is arranged in the first terminal hole of the first housing 110. The second connector 20 includes a second housing 210 and a second terminal 201 arranged in the second housing 210. The second terminal 201 is arranged in the second terminal hole of the second housing 210. In the illustrated embodiment, one end of the first terminal 101 is crimped on the conductor of the cable 1, one end of the second terminal 201 can be electrically connected to the electrical equipment, and the other end of the second terminal 201 is inserted into the other end of the first terminal 101, so that the electrical connection between the cable 1 and the electrical equipment can be realized.

Figure 3A:
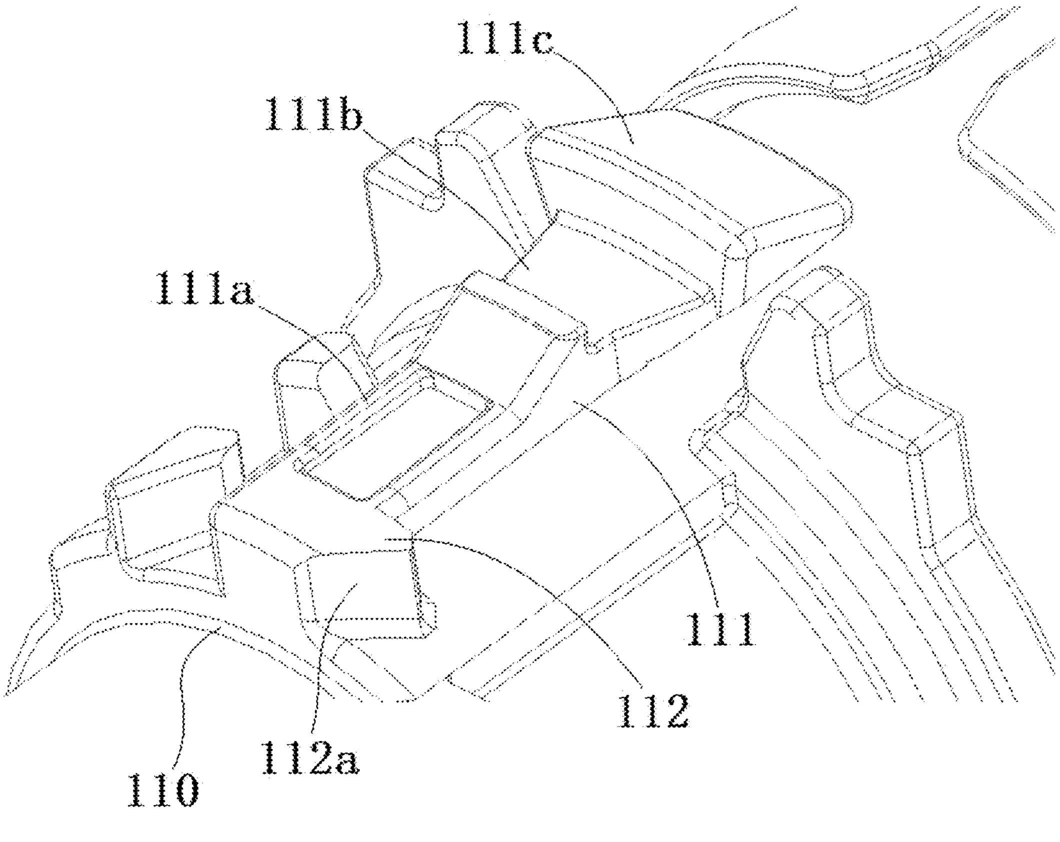
FIG. 3A shows a partially enlarged schematic diagram of the first connector in FIG. 1.
Figure 4:
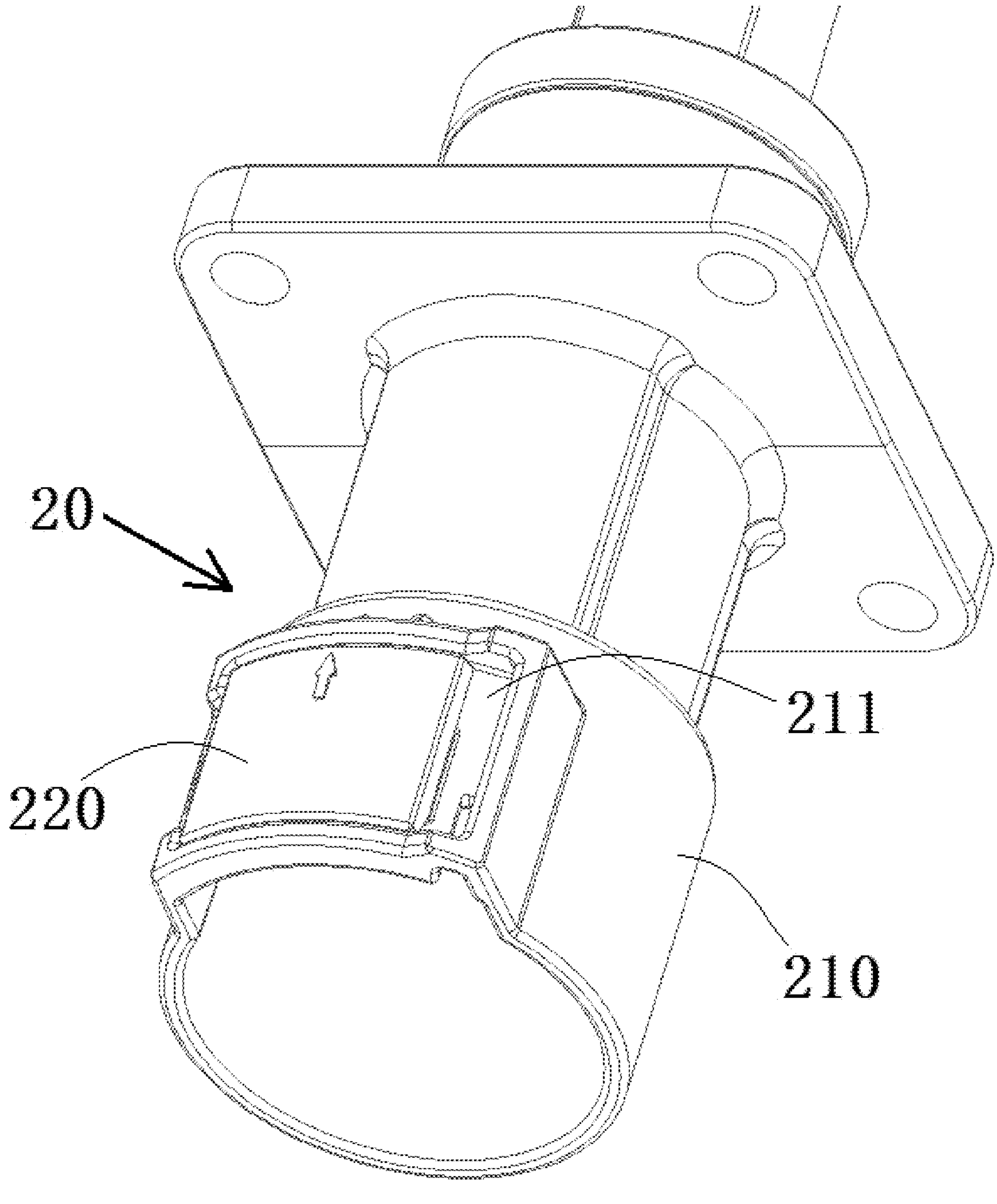
FIG. 4 shows a three-dimensional schematic diagram of the second connector in FIG. 1, in which a guide slot on the second connector and a latch safety installed in the guide slot are shown.

FIG. 3A shows a partially enlarged schematic diagram of the first connector 10 in FIG. 1; FIG. 4 shows a three-dimensional schematic diagram of the second connector 20 in FIG. 1, in which a guide slot 211 on the second connector 20 and a latch safety 220 installed in the guide slot 211 are shown.

As shown in FIGS. 1-4, in the illustrated embodiment, the first housing 110 is adapted to be partially inserted into the second housing 210 along an axial direction of the first housing 110 or the second housing 210, and an elastic latch 111 suitable for locking the second housing 210 is formed on the first housing 110. A latch safety 220 capable of moving along a circumferential direction of the second housing 210 is installed on the second housing 210.

Figure 7:
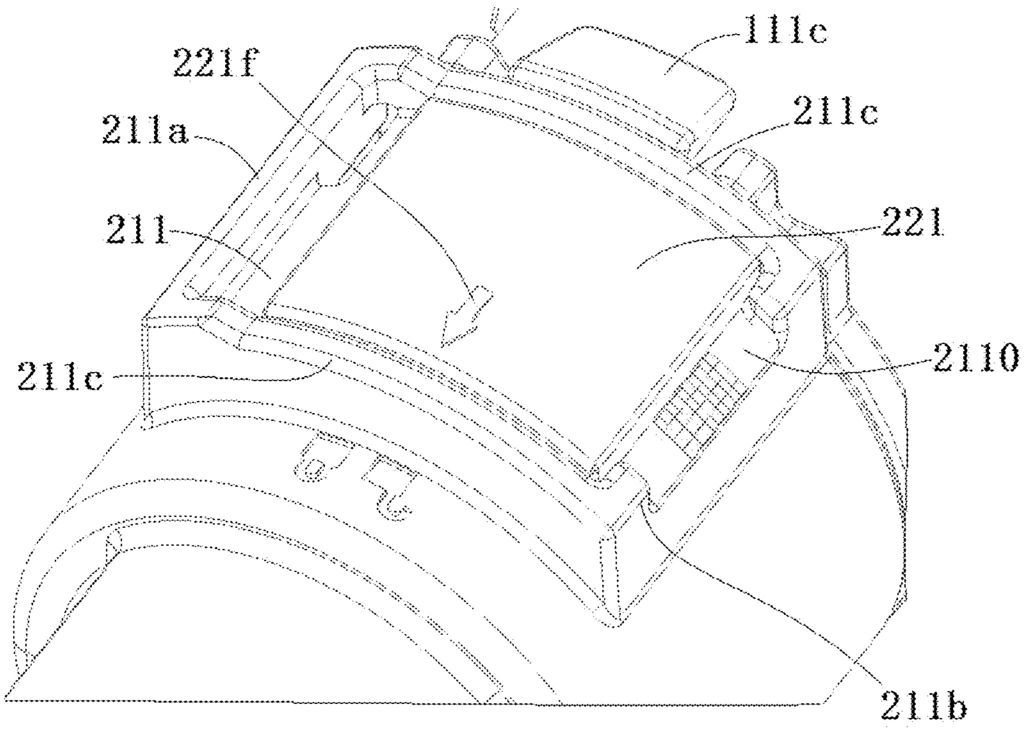
FIG. 7 shows a partially enlarged schematic diagram of the connector assembly shown in FIG. 1, wherein the latch safety is in the pre-locking position.
Figure 8:
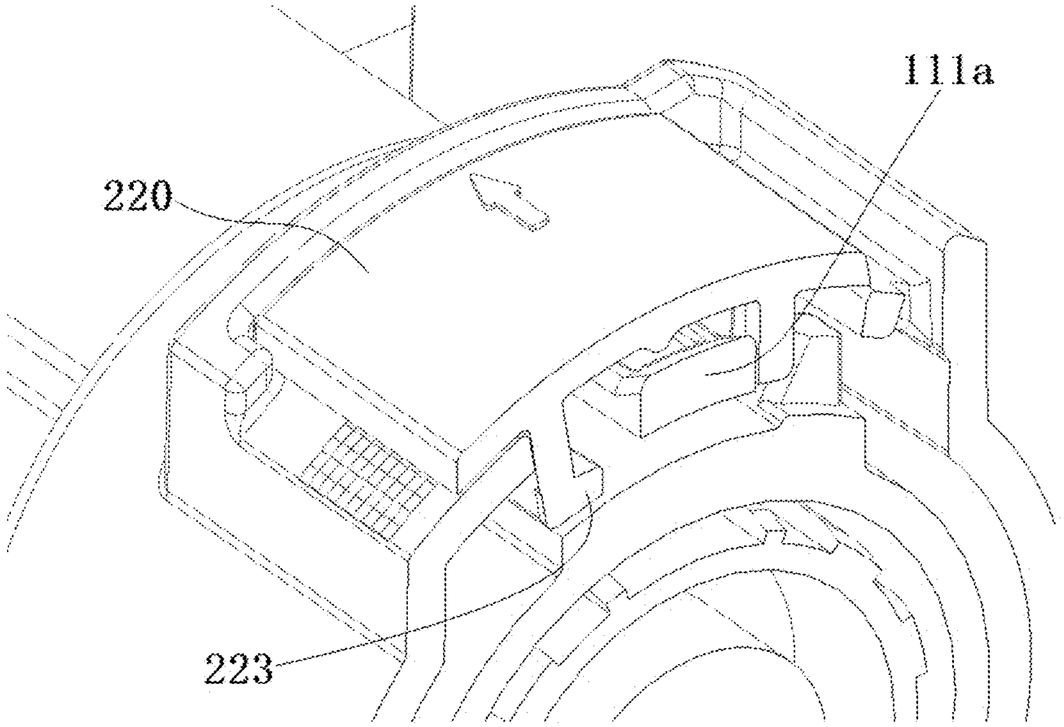
FIG. 8 shows a sectional view of the connector assembly shown in FIG. 7.
Figure 9:
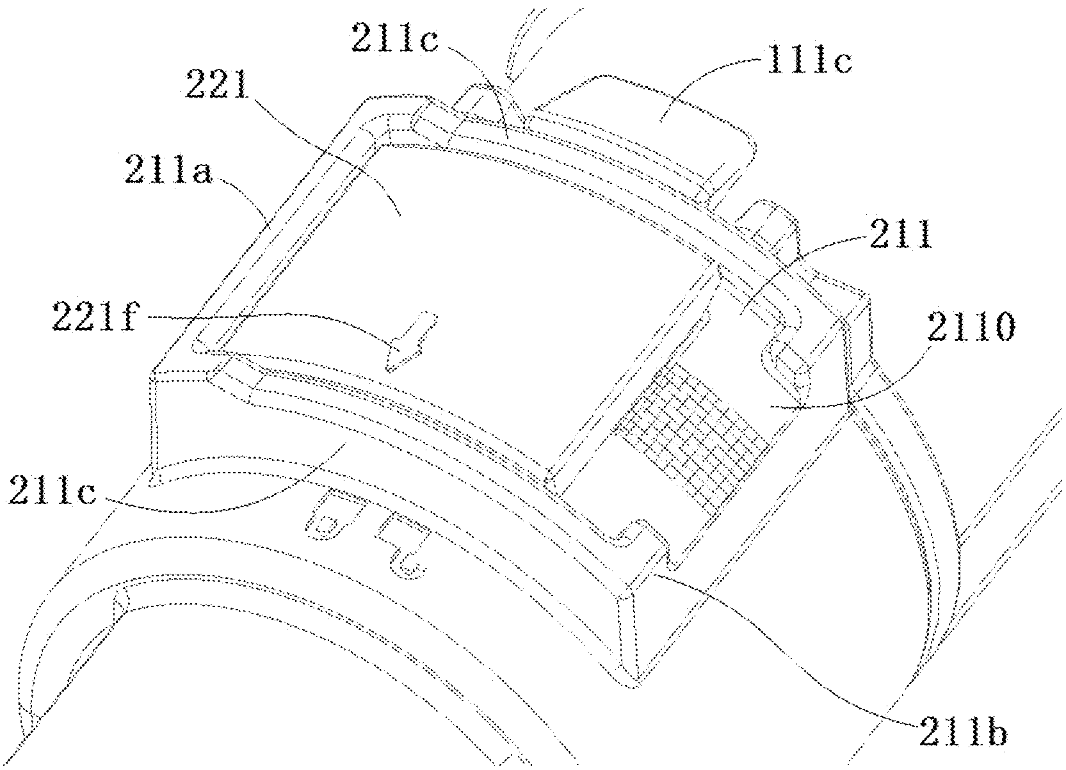
FIG. 9 shows a partially enlarged schematic diagram of the connector assembly shown in FIG. 1, wherein the latch safety is in the safety position.
Figure 10:
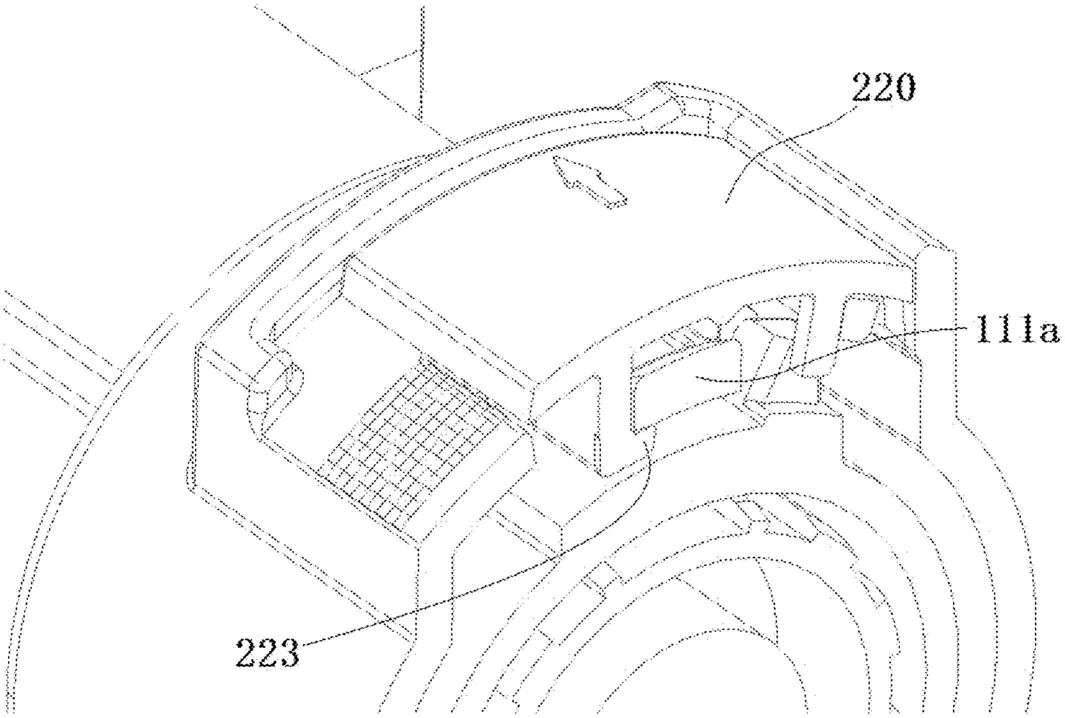
FIG. 10 shows a sectional view of the connector assembly shown in FIG. 9.

FIG. 7 shows a partially enlarged schematic diagram of the connector assembly shown in FIG. 1, wherein the latch safety is in the pre-locking position (or referred as an initial position); FIG. 8 shows a sectional view of the connector assembly shown in FIG. 7; FIG. 9 shows a partially enlarged schematic diagram of the connector assembly shown in FIG. 1, wherein the latch safety 220 is in the safety position; and FIG. 10 shows a sectional view of the connector assembly shown in FIG. 9.

As shown in FIGS. 1-4 to 7-10, in the illustrated embodiment, the latch safety 220 is adapted to move between the safety position (the position shown in FIGS. 9-10) to prevent the elastic latch 111 from being unlocked and the pre-locking position (the position shown in FIGS. 7-8) to allow the elastic latch 111 to be unlocked. In the illustrated embodiment, when the first connector 10 and the elastic latch 111 are pre installed on the second housing 210, the latch safety 220 is in the pre-locking position, and the elastic latch 111 is allowed to be unlocked.

Figure 5A:
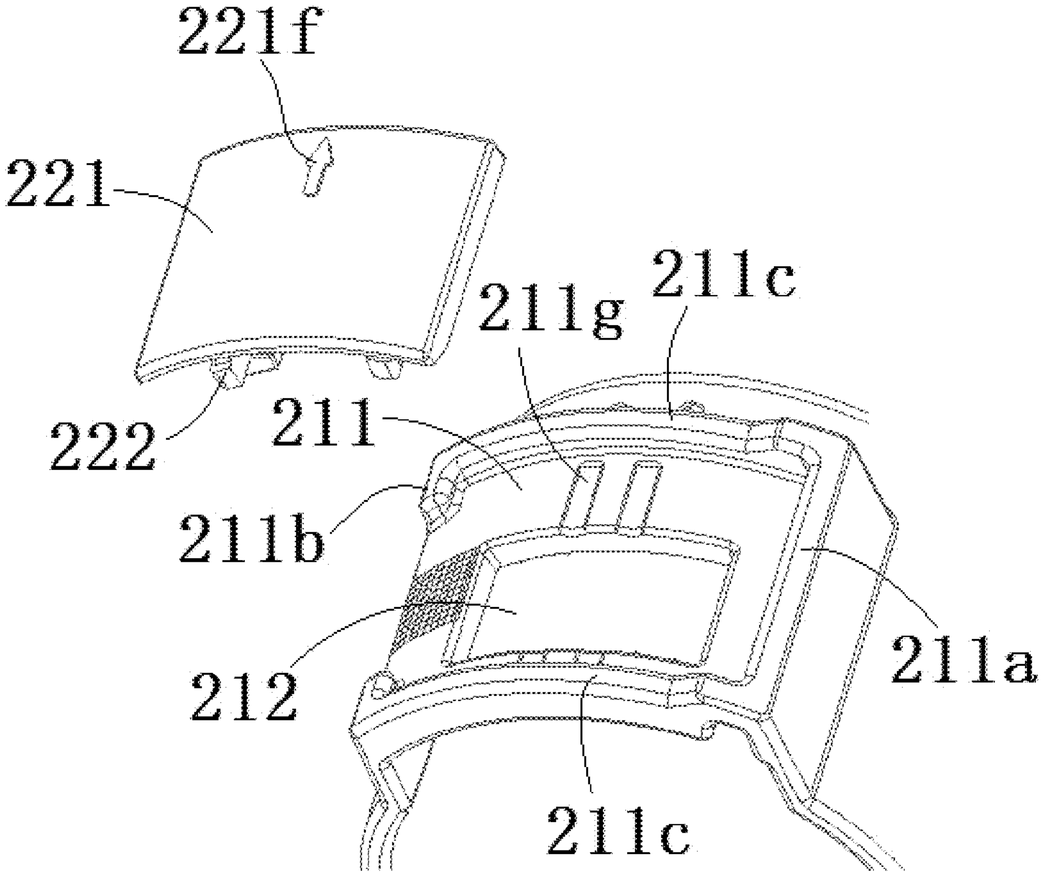
FIG. 5A shows a partially enlarged schematic view of FIG. 4 when viewed from the top, in which the guide slot on the second connector and the latch safety not yet installed in the guide slot are shown.
Figure 5B:
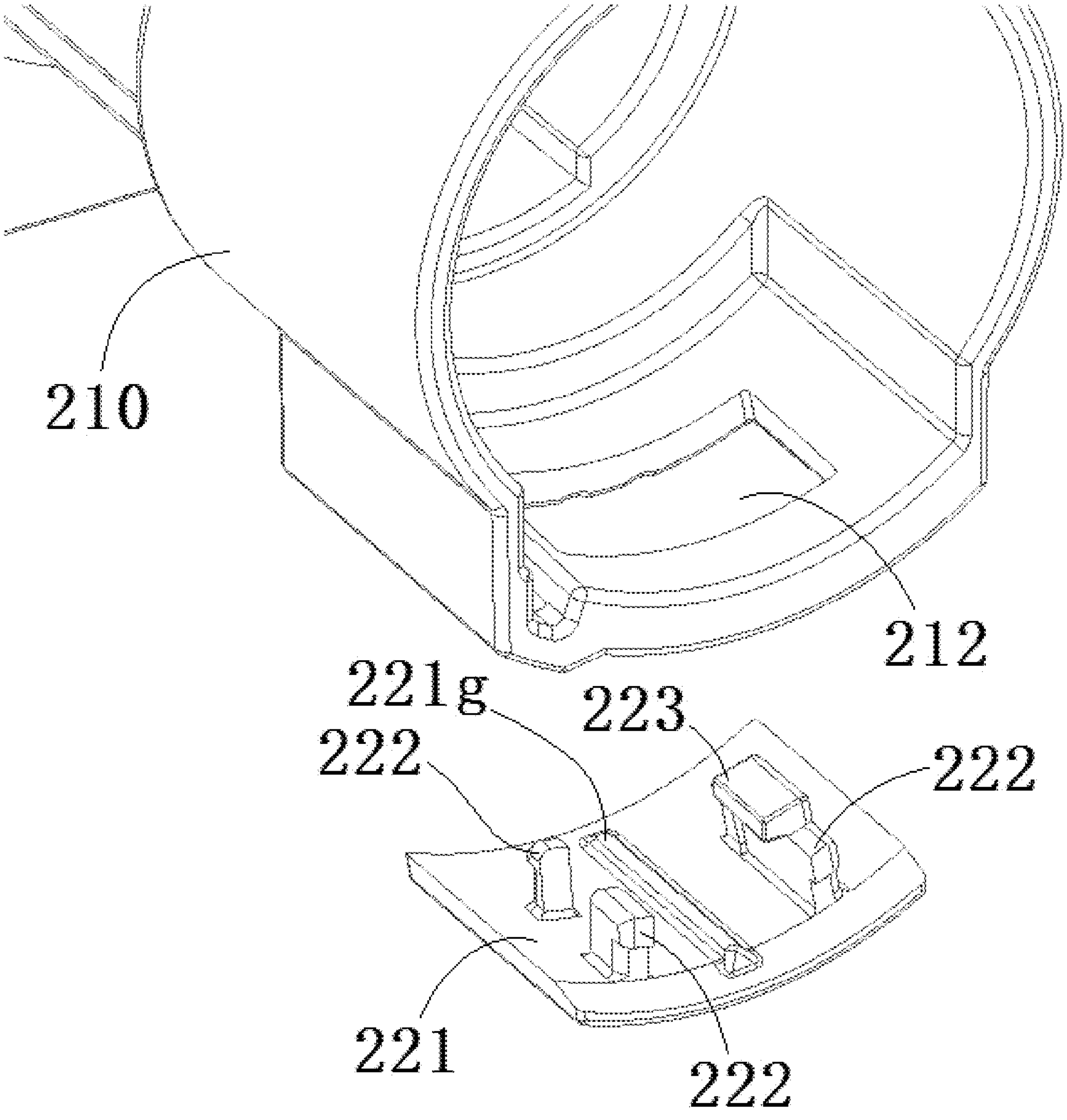
FIG. 5B shows a partially enlarged schematic view of FIG. 4 when viewed from the bottom, in which the guide slot on the second connector and the latch safety not yet installed in the guide slot are shown.
Figure 6:
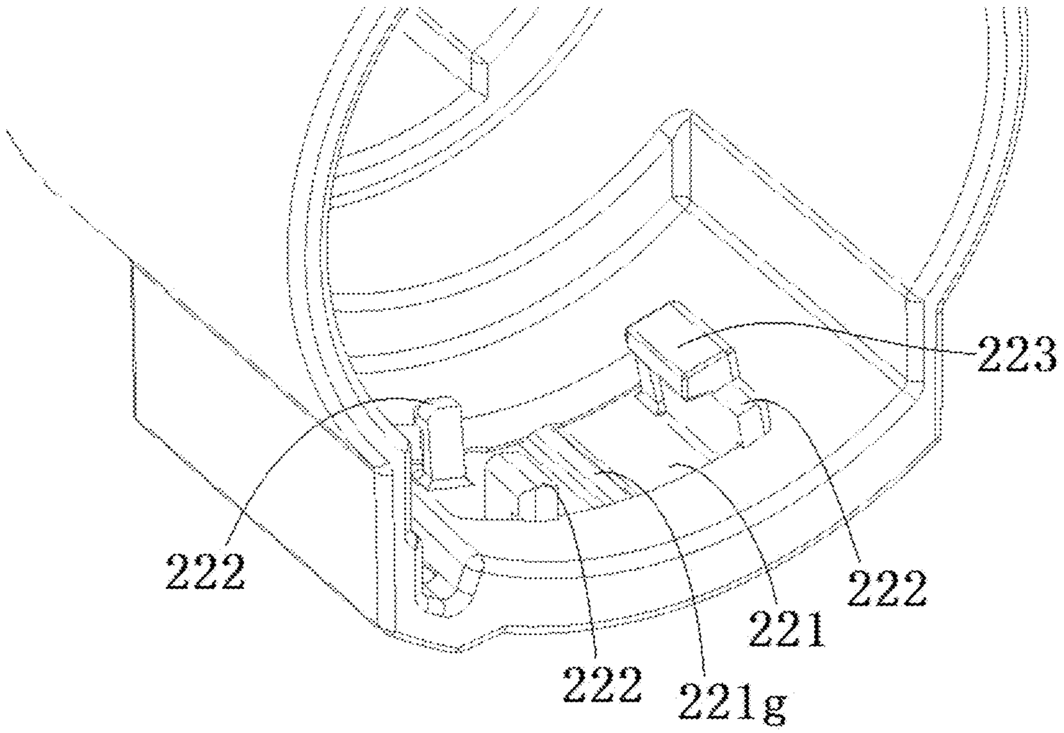
FIG. 6 shows the assembly diagram of the second housing and latch safety shown in FIGS. 5A and 5B.

FIG. 5A shows a partially enlarged schematic view of FIG. 4 when viewed from the top, in which the guide slot 211 on the second connector and the latch safety 220 not yet installed in the guide slot 211 are shown; FIG. 5B shows a partially enlarged schematic view of FIG. 4 when viewed from the bottom, in which the guide slot 211 on the second connector and the latch safety 220 not yet installed in the guide slot 211 are shown; FIG. 6 shows the assembly diagram of the second housing 210 and latch safety 220 shown in FIGS. 5A and 5B.

As shown in FIGS. 1 to 10, in the illustrated embodiment, a pushing part 112 is formed on the first housing 110, the pushing part 112 is adapted to push the latch safety 220 from the safety position to the pre-locking position at which the latch safety 220 does not interfere with the elastic latch 111 during the insertion of the first housing 110 into the second housing 210, so that the plug connector 10 can be inserted smoothly, and there will be no collision and interference between the elastic latch 111 and the latch safety 220.

As shown in FIG. 3A and FIGS. 6-10, in the illustrated embodiment, a guide slope 112*a* inclined to the axial direction of the first connector is formed on the pushing part 112, and the pushing part 112 contacts and pushes the latch safety 220 through the guide slope 112*a* to drive and guide the latch safety 220 to move from the safety position to the pre-locking position in the circumferential direction.

As shown in FIGS. 1 to 10, in the illustrated embodiment, a guide slot 211 extending along the circumferential direction is formed on the outer wall of the second housing 210, the latch safety 220 is slidably installed in the guide slot 211, and the guide slot 211 is used to guide the latch safety 220 to move between the safety position and the pre-locking position along the circumferential direction.

As shown in FIGS. 1 to 10, in the illustrated embodiment, the latch safety 220 mainly includes a sliding plate 221 and one or more limiting parts 222. The sliding plate 221 is an arc plate extending in the circumferential direction. The limiting part 222 is connected to the bottom surface of the sliding plate 221. An opening 212 is formed on the second housing 210, and the limiting part 222 extends into the second housing 210 through the opening 212. In the illustrated embodiment, the opening 212 is located on the bottom wall of the guide slot 211 and is completely covered by the sliding plate 221.

As shown in FIGS. 1 to 10, in the illustrated embodiment, the front and rear edges of the opening 212 opposite to each other in the axial direction are slidably held between the limiting part 222 and the sliding plate 221 to limit the movement of the latch safety 220 in the radial direction of the second housing 210. In this way, the latch safety 220 is allowed to move only in the circumferential direction in the guide slot 211.

As shown in FIGS. 1 to 10, in the illustrated embodiment, the elastic latch 111 mainly includes an elastic cantilever 111*a* and a locking portion 111*b*. The elastic cantilever 111*a* is connected to the first housing 110 and is adapted to move between a locking position and an unlocking position. The locking portion 111*b* is formed on the elastic cantilever 111*a* and is suitable for locking the second housing 210. The latch safety 220 includes a tongue 223 connected to the limiting part 222, which is adapted to be inserted into the gap between the elastic cantilever 111*a* and the outer wall of the first housing 110 to prevent the elastic cantilever 111*a* from be moved to the unlocking position. In this way, the risk of accidental unlocking of the elastic latch 111 caused by the operator's misoperation can be avoided.

As shown in FIGS. 1 to 10, in the illustrated embodiment, the guide slope 112*a* of the pushing part 112 is adapted to contact and push the tongue 223 of the latch safety 220, so as to move the latch safety 220 from the safety position to the pre-locking position.

As shown in FIGS. 1 to 10, in the illustrated embodiment, the fixed end of the elastic cantilever 111*a* is connected with the pushing part 112 and is fixedly connected to the outer wall of the first housing 110 through the pushing part 112. However, the present invention is not limited to the illustrated embodiment, and the pushing part 112 may be separated from the elastic cantilever 111*a*.

As shown in FIGS. 1 to 10, in the illustrated embodiment, the elastic latch 111 also includes a pressing part 111*c* connected to the free end of the elastic cantilever 111*a*, which is exposed to the outside of the second housing 210 when the first housing 110 is inserted into the second housing 210 to allow human fingers to press the pressing part 111*c*. In this way, after the latch safety 220 is moved to the pre-locking position, the elastic latch 111 can be unlocked by pressing the pressing part 111*c* with a finger.

As shown in FIGS. 1 to 10, in the illustrated embodiment, two positioning grooves 211*g* extending along the axial direction are formed on the bottom wall of the guide slot 211, and a positioning rib 221*g* extending along the axial direction is formed on the inner surface of the sliding plate 221. When the latch safety 220 is installed in the guide slot 211 and moved to the safety position, the positioning rib 221*g* is positioned in one of the two positioning grooves 211*g*. When the latch safety 220 is installed in the guide slot 211 and moved to the pre-locking position, the positioning rib 221*g* is positioned in the other of the two positioning grooves 211*g*. The design of the positioning rib 221*g* and the positioning grooves 211*g* can not only enhance the operating hand feeling of the operator, but also position the latch safety 220 in the safety position and the pre-locking position respectively.

As shown in FIGS. 1 to 10, in the illustrated embodiment, an indication arrow 221*f* is formed on the outer surface of the sliding plate 221, and a safety position identification (for example, a closed lock identification, indicating that the elastic latch 111 cannot be unlocked) and a pre-locking position identification (for example, an opened lock identification, indicating that the elastic latch 111 can be unlocked) are formed on the outer wall of the second housing 210. When the latch safety 220 is installed in the guide slot 211 and moved to the safety position, the indication arrow 221*f* points to the safety position identification. When the latch safety 220 is installed in the guide slot 211 and moved to the pre-locking position, the indication arrow 221*f* points to the pre-locking position identification. Therefore, when the indication arrow 221*f* points to the pre-locking position identification, the pressing part 111*c* of the elastic latch 111 can be pressed by fingers to unlock the elastic latch 111.

As shown in FIGS. 4 to 10, in the illustrated embodiment, the guide slot 211 is surrounded by a first end wall 211*a* and a second end wall 211*b* opposite to each other in the circumferential direction and two side walls 211*c* opposite to each other in the axial direction. The latch safety 220 is adapted to move in the circumferential direction between the first end wall 211*a* and the second end wall 211*b* of the guide slot 211.

As shown in FIGS. 4 to 10, in the illustrated embodiment, the sliding plate 221 includes first and second ends opposite to each other in the circumferential direction and front and rear sides opposite to each other in the axial direction. The first and second ends of the sliding plate 221 respectively correspond to the first end wall 211*a* and the second end wall 211*b* of the guide slot 211, and the front and rear sides of the sliding plate 221 respectively correspond to the two side walls 211*c* of the guide slot 211.

As shown in FIGS. 4 to 10, in the illustrated embodiment, when the latch safety 220 is moved to the safety position along the guide slot 211, the end face of the first end of the sliding plate 221 abuts against the first end wall 211*a* of the guide slot 211, and the top surface of the first end wall 211*a* of the guide slot 211 is higher than the outer surface of the sliding plate 221, so that human fingers cannot contact the end face of the first end of the sliding plate 221. In this way, the operator cannot push the end face of the first end of the sliding plate 221 with his fingers to realize the reset of the latch safety 220, which avoids the false or accidental reset of the latch safety 220 and improves the use safety.

As shown in FIGS. 4 to 10, in the illustrated embodiment, the outer surface of the sliding plate 221 is a smooth surface, and in the illustrated embodiment, it is a smooth arc surface, so that the friction force between the human finger and the outer surface of the sliding plate 221 is not enough to push the latch safety 220 to move. In this way, the latch safety 220 can be further prevented from being wrongly or accidentally reset, thereby further improving the use safety.

As shown in FIGS. 4 to 10, in the illustrated embodiment, a slot 221*a* is formed on the end face of the first end of the sliding plate 221 or on the inner wall surface of the first end wall 211*a* of the guide slot 211. The slot 221*a* is arranged so that adult fingers cannot be inserted, but the corresponding tool (not shown, for example, a screwdriver with a flat head) can be inserted. Thus, the latch safety 220 can be moved from the safety position to the pre-locking position by a tool inserted into the slot 221*a*. Therefore, in the present invention, in order to realize the reset operation of the latch safety 220 from the safety position to the pre-locking position, a tool must be used, which cannot be realized by human fingers. Therefore, the invention can effectively prevent the latch safety 220 from being wrongly or accidentally reset due to the misoperation of the operator, and improve the use safety.

As shown in FIGS. 4 to 10, in the illustrated embodiment, the front and rear sides of the sliding plate 221 respectively abut against the two side walls 211*c* of the guide slot 211, and the top surfaces of the two side walls 211*c* of the guide slot 211 are higher than the outer surface of the sliding plate 221, so that human fingers cannot contact the front and rear sides of the sliding plate 221. In this way, the human hand cannot realize the reset of the latch safety 220 by grasping the sides of the front and rear sides of the sliding plate 221, which can further avoid the false or accidental reset of the latch safety 220, so as to further improve the use safety.

As shown in FIGS. 4 to 10, in the illustrated embodiment, a notch 2110 is formed on the second end wall 211*b* of the guide slot 211; and/or the top surface of the second end wall 211*b* of the guide slot 211 is lower than the outer surface of the sliding plate 221, to allow human fingers to contact the end face of the second end of the sliding plate 221. In this way, the sliding plate 221 can be pushed from the pre-locking position to the safety position by fingers.

As shown in FIGS. 4 to 10, in the illustrated embodiment, when the latch safety 220 is moved to the pre-locking position, the second end of the sliding plate 221 rests against the second end wall 211*b* of the guide slot 211. In this way, the latch safety 220 can be limited to the pre-locking position.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly, comprising:
a first connector comprising a first housing; and
a second connector adapted to mate with the first connector and comprising a second housing,
wherein the first housing is adapted to be partially inserted into the second housing along an axial direction of the second housing, and an elastic latch for locking the second housing is formed on the first housing,
wherein a latch safety is installed on the second housing and movable along a circumferential direction of the second housing between a safety position to prevent the elastic latch from being unlocked and a pre-locking position to allow the elastic latch to be unlocked,
wherein a pushing part having a guide slope inclined to the axial direction is formed on the first housing and adapted to contact and push the latch safety along the circumferential direction to the pre-locking position at which the first housing is allowed to be inserted into the second housing.

2. The connector assembly according to claim 1,
wherein a guide slot extending along the circumferential direction is formed on the outer wall of the second housing, the latch safety is slidably installed in the guide slot, and the guide slot is configured to guide the latch safety to move between the safety position and the pre-locking position along the circumferential direction.

3. The connector assembly according to claim 2,
wherein the latch safety comprises:
a sliding plate slidably installed in the guide slot; and
a limiting part connected to the sliding plate,
wherein an opening is formed on the second housing, and the limiting part extends into the second housing through the opening,
wherein front and rear edges of the opening in the axial direction are slidably held between the limiting part and the sliding plate to limit the movement of the latch safety in a radial direction of the second housing.

4. The connector assembly according to claim 3,
wherein the elastic latch comprises:
an elastic cantilever connected to the first housing and adapted to move between a locking position and an unlocking position; and
a locking portion formed on the elastic cantilever and adapted to lock the second housing,
wherein the latch safety includes a tongue connected to the limiting part, the tongue is adapted to be inserted into a gap between the elastic cantilever and the outer wall of the first housing to prevent the elastic cantilever from being moved to the unlocking position.

5. The connector assembly according to claim 4,
wherein the guide slope of the pushing part is adapted to contact and push the tongue part of the latch safety to move the latch safety from the safety position to the pre-locking position.

6. The connector assembly according to claim 4,
wherein the fixed end of the elastic cantilever is connected with the pushing part and is fixedly connected to the outer wall of the first housing through the pushing part.

7. The connector assembly according to claim 4,
wherein the elastic latch also includes a pressing part connected to the free end of the elastic cantilever, the pressing part is exposed to the outside of the second housing when the first housing is inserted into the second housing.

8. The connector assembly according to claim 3,
wherein two positioning grooves extending along the axial direction are formed on the bottom wall of the guide slot, and a positioning rib extending along the axial direction is formed on the inner surface of the sliding plate;
wherein when the latch safety is installed in the guide slot and moved to the safety position, the positioning rib is positioned in one of the two positioning grooves;
wherein when the latch safety is installed in the guide slot and moved to the pre-locking position, the positioning rib is positioned in the other of the two positioning grooves.

9. The connector assembly according to claim 3,
wherein an indication arrow is formed on the outer surface of the sliding plate, and a safety position identification and a pre-locking position identification are formed on the outer wall of the second housing;
wherein when the latch safety is installed in the guide slot and moved to the safety position, the indication arrow points to the safety position identification;
wherein when the latch safety is installed in the guide slot and moved to the pre-locking position, the indication arrow points to the pre-locking position identification.

10. The connector assembly according to claim 3, wherein the guide slot is surrounded by a first end wall and a second end wall opposite to each other in the circumferential direction and two side walls opposite to each other in the axial direction;

wherein the latch safety is adapted to move between the first end wall and the second end wall of the guide slot along the circumferential direction.

11. The connector assembly according to claim 10, wherein the sliding plate comprises a first end and a second end opposite to each other in the circumferential direction and front and rear sides opposite to each other in the axial direction;

wherein the first and second ends of the sliding plate respectively correspond to the first end wall and the second end wall of the guide slot, and the front and rear sides of the sliding plate respectively correspond to the two side walls of the guide slot.

12. The connector assembly according to claim 1, further comprising:

a first terminal provided in a first terminal hole of the first housing; and a second terminal provided in a second terminal hole of the second housing and suitable for electrical contact with the first terminal.

13. A connector, comprising:

a housing in which a terminal hole for placing a terminal is formed, wherein the housing is provided with an elastic latch suitable for locking a mating housing;

wherein when the housing is inserted into the mating housing along an axial direction of the mating housing, the elastic latch cooperates with a latch safety to hold the housing and the mating housing in a mating position;

wherein the housing is provided with a pushing part, which is suitable for pushing the latch safety to a pre-locking position before the housing is inserted into the mating housing, so as to allow the housing to be inserted into the mating housing;

wherein the pushing part is provided with a guide slope inclined to the axial direction, and the pushing part is adapted to contact and push the latch safety through the guide slope, so as to drive and guide the latch safety to move from a safety position to the pre-locking position along the circumference of the mating housing.

14. A connector assembly, comprising:

a first connector comprising a first housing; and a second connector adapted to mate with the first connector and comprising a second housing, wherein the first housing is adapted to be partially inserted into the second housing along an axial direction of the second housing, and an elastic latch for locking the second housing is formed on the first housing, wherein a latch safety is installed on the second housing and movable along a circumferential direction of the second housing between a safety position to prevent the elastic latch from being unlocked and a pre-locking position to allow the elastic latch to be unlocked, wherein a pushing part is formed on the first housing and adapted to push the latch safety to the pre-locking position at which the first housing is allowed to be inserted into the second housing;

wherein a guide slot extending along the circumferential direction is formed on the outer wall of the second housing;

wherein a sliding plate slidably of the latch safety is installed in the guide slot, the sliding plate having a limiting part;

wherein an opening is formed on the second housing, and the limiting part extends into the second housing through the opening, wherein front and rear edges of the opening in the axial direction are slidably held between the limiting part and the sliding plate to limit the movement of the latch safety in a radial direction of the second housing.

* * * * *